United States Patent [19]
Liao et al.

[11] Patent Number: 6,160,727
[45] Date of Patent: Dec. 12, 2000

[54] AUTOMATIC POWER CONTROL DEVICE

[76] Inventors: Kuang-Hua Liao; Shu-Chen Liu, both of No. 43, Sung-Hsin Rd., Taipei, Taiwan

[21] Appl. No.: 09/548,501

[22] Filed: Apr. 13, 2000

[30]     Foreign Application Priority Data

Jun. 17, 1999 [TW]   Taiwan ............................... 088210047

[51] Int. Cl.⁷ ................................................ H02M 7/155
[52] U.S. Cl. ............................................ 363/125; 307/66
[58] Field of Search ..................................... 363/125, 126, 363/127, 128, 81, 84; 307/64, 66, 80; 323/905

[56]           References Cited

U.S. PATENT DOCUMENTS

| | | | |
|---|---|---|---|
| 4,055,789 | 10/1977 | Lasater ...................... | 320/124 |
| 5,705,898 | 1/1998 | Yamashita et al. ...................... | 315/308 |
| 5,859,499 | 1/1999 | McAfee et al. ............... | 315/86 |
| 5,910,689 | 6/1999 | Ertz, III et al. ............. | 307/64 |
| 5,982,098 | 11/1999 | Redgate ..................... | 315/86 |
| 6,037,758 | 3/2000 | Perez ...................... | 323/268 |
| 6,038,118 | 3/2000 | Guerra ..................... | 361/111 |
| 6,057,609 | 5/2000 | Nagai et al. ............... | 307/66 |

*Primary Examiner*—Adolf Deneke Berhane
*Attorney, Agent, or Firm*—Dellett and Walters

[57]           ABSTRACT

An automatic power control device has a charge battery, a voltage level circuit, a power circuit, and a first and a second photo control circuit. The voltage level circuit has an indication lamp, a switch connected with the indication lamp in parallel, two resistors respectively connected to an end of the switch, and two neon lamps connected to the two resistors, so as to turn on one or two neon lamps by turning the switch off or on thereby generating light. The first and second photo control circuits are provided for detecting the light from the neon lamps to activate the power circuit for selectively supplying power to a load and the charge battery. Each photo control circuit has a photo resistor for detecting the light. The first photo control circuit has a first relay to control the power supply of the power circuit. The second photo control circuit has a second relay for determining whether the power circuit or the charge battery supplies power.

7 Claims, 1 Drawing Sheet

AUTOMATIC POWER CONTROL DEVICE

BACKGROUND OF THE INVENTION

1. Field of the Invention

The present invention relates to a power control device and, more particularly, to a power control device for providing an uninterrupted power supply.

2. Description of Related Art

Recently, people have paid much attention on how to escape from a building in an emergency. Therefore, the known emergency light devices are generally installed around the doors or stairs of a building for providing illumination when hazard occurs and the power of the building has been cut off, such that the people can be guided to escape.

These devices are simply installed around the doors or stairs so that only a small part of area can be illuminated, which is deemed to be unsatisfactory if the building is large. Therefore, it is proposed to use the general lamp devices to provide emergency illumination. However, the use of general lamp devices as the emergency light devices requires a complicated wiring connection process, and thus the cost is too high.

Moreover, in use of the emergency light device or the general lamp device to provide emergency illumination, an uninterrupted power supply (UPS) has to be employed for supplying power to the emergency light device or the general lamp device at the moment of power failure. However, the UPS usually can not be started in time so that there may be a time period, for example 5 seconds, in which there is no power being supplied and the building is thus completely dark. Such a dark period will delay the time for the people to escape, and may lead to serious injury or death. Therefore, there is a need for a novel design for the emergency light device to mitigate and/or obviate the aforementioned problems.

SUMMARY OF THE INVENTION

The object of the present invention is to provide an automatic power control device that is safe in use, fast in operation, and easy to install.

To achieve the object, the automatic power control device in accordance with the present invention includes a charge battery, a voltage level circuit, a power circuit, and a first and a second photo control circuit. The voltage level circuit has an indication lamp, a switch connected with the indication lamp in parallel, two resistors respectively connected to an end of the switch, and two neon lamps, so as to turn on one or two neon lamps by turning the switch off or on thereby generating light. The power circuit is used for providing power supply. The first and second photo control circuits are provided for detecting the light from the neon lamps to activate the power circuit for selectively supplying power to a load and the charge battery. Each photo control circuit has a photo resistor for detecting the light that comes from one of the neon lamps. The first photo control circuit has a first relay to control the power supply of the power circuit. The second photo control circuit has a second relay for determining whether the power circuit or the charge battery supplies power.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
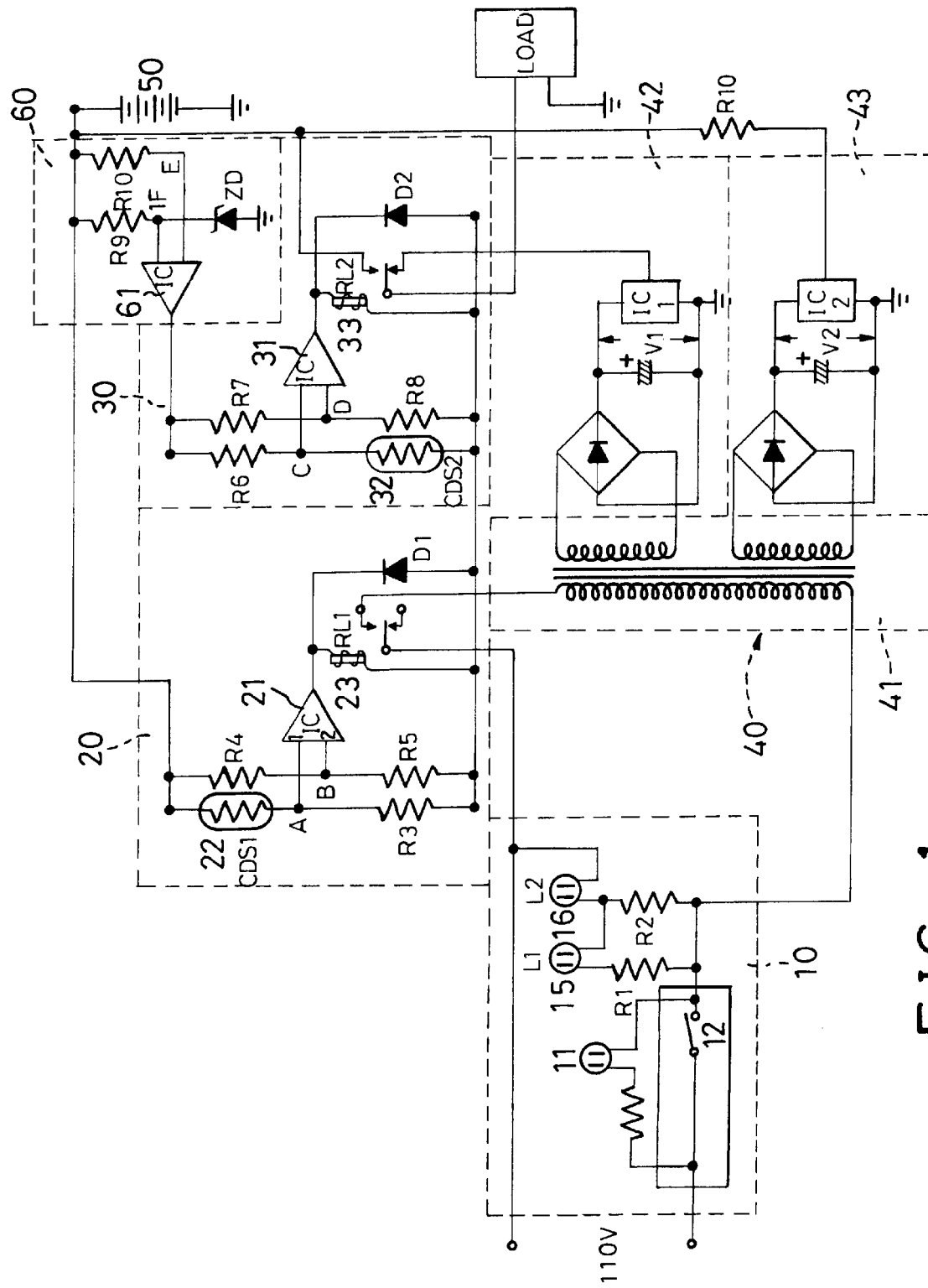
FIG. 1 is a circuit diagram of an automatic power control device in accordance with the present invention

With reference to FIG. 1, there is shown an automatic power control device in accordance with the present invention. As shown, the device includes a voltage level circuit (10), a first photo control circuit (20), a second photo control circuit (30), a power circuit (40), a charge battery (50), and a power detection circuit (60).

The voltage level circuit (10) includes an indication lamp (11), a switch (12) connected with the indication lamp (11) in parallel, two resistors R1, R2 respectively connected to an end of the switch (12), two neon lamps (15, 16) connected to the two resistors R1, R2 and the input power. The indication lamp (11) and the switch (12) are known devices and operated in such a manner that the indication lamp (11) is off when the switch (12) is on, and the indication lamp (11) is on when the switch (12) is off.

The two neon lamps (15, 16) are both turned on when the switch (12) is on and, when the switch (12) is off, only the neon lamp (16) is turned on as being supplied with a small current via the indication lamp (11) due to a voltage dividing effect provided by the resistors R1, R2.

The first photo control circuit (20) includes a comparator (21) which has an input pin connected to a photo resistor (22) and a resistor R3. The reference voltage pin of the comparator (21) is connected to two resistors R4 and R5. The output pin of the comparator (21) is connected to a relay (23).

The photo resistor (22) is faced to the neon lamp (15) of the voltage level circuit (10). Therefore, when the neon lamp (15) is turned on, the resistance of the photo resistor (22) becomes low. As such, the voltage at the input pin of the comparator (21) is higher than the reference voltage, and thus a high voltage level is output.

The relay (23) has an excitation coil connected to the output pin of the comparator (21). The common end of the relay switch excited by the excitation coil is connected to the input power, and the normally opened end of the relay switch is connected to the power circuit (40). When the comparator (21) outputs a high voltage level, the relay (23) is excited so that the common end is switched to the normally opened end, so as to start the power circuit (40) to supply power.

The second photo control circuit (30) includes a comparator (31) which has an input pin connected to a photo resistor (32) and a resistor R6. The reference voltage pin of the comparator (31) is connected to two resistors R7 and R8. The output pin of the comparator (31) is connected to a relay (33).

The photo resistor (32) is faced to the neon lamp (16) of the voltage level circuit (10). Therefore, when the neon lamp (16) is turned on, the resistance of the photo resistor (32) becomes low. As such, the voltage at the input pin of the comparator (31) is lower than the reference voltage, and thus a low voltage level is output.

The relay (33) has an excitation coil connected to the output pin of the comparator (31). The common end of the relay switch excited by the excitation coil is connected to a load (lamp device). The normally closed end of the relay switch is connected to the power circuit (40). The normally opened end of the relay switch is connected to the charge battery (50). When the comparator (31) outputs a low voltage level, the relay (33) is not excited and the power circuit (40) supplies power to the load. On the contrary, if the comparator (31) outputs a high voltage level, the common end of the relay switch is switched to the normally opened end, so that the load receives power from the charge battery (50), instead of the power circuit (40).

The power circuit (40) includes a transformer (41) and two power supply circuits (42, 43). The primary winding of the transformer (41) is connected to the input power via the relay (23) of the first photo control circuit (20). The secondary winding of the transformer (41) is connected to the two power supply circuits (42, 43). Each of the power supply circuits (42, 43) includes a bridge rectifier, a capacitor, and a voltage-stabilization IC. The output of the power supply circuit (42) is connected to the normally closed end of the relay switch of the second photo control circuit (30). The output of the power supply circuit (43) is connected to the charge battery (50) and the normally opened end of the relay switch of the second photo control circuit (30).

In addition to connecting to the output terminal of the power circuit (40), the charge battery (50) has a positive terminal connected to the power detection circuit (60) and the input terminal of the first photo control circuit (20).

The power detection circuit (60) is comprised of a comparator (61) which has a first input connected to charge battery (51) via a resistor R10 and a second input connected to a fixed reference voltage circuit formed by a resistor R9 and a zener diode ZD. The output of the comparator (61) is connected to the input of the second photo control circuit (30). As such, when the output voltage of the charge battery (50) is higher than the reference voltage of the comparator (61), the comparator (61) outputs a high voltage level to activate the second photo control circuit (30). On the contrary, when the charge battery (50) is low and outputs a voltage lower than the reference voltage, the comparator (61) outputs a low voltage level and the second photo control circuit (30) is not activated such that the charge battery (50) does not supply power to the load. Therefore, the power detection circuit (60) is able to prevent the charge battery from over-discharging, and assures that the photo control circuit (20, 30) can be efficiently activated. Moreover, the user is able to know whether the charge battery (50) is operated correctly.

Because the photo control circuits (20, 30) are powered by the charge battery (50), the supply of power to the load from the charge battery (50) is restricted to ensure that the charge battery (50) has enough power to supply to the photo control circuits (20, 30). If the charge battery (50) is out of order and can not supply power normally, the lamp device (load) will not be turned on by the user because the photo control circuit (20, 30) can not be activated by the charge battery (50). As a result, the user can be aware of the fact that the charge battery (50) is out of order and requires to be replaced.

In view of foregoing, the structure of the automatic power control device in accordance with the present invention is disclosed, while its operation manner is as follows:

If the power supply is normal and the switch (12) is on, the neon lamps (15, 16) of the voltage level circuit (10) are turned on, wherein the light of the neon lamp (15) makes the resistance of the photo resistor (22) low. Therefore, the output of the first photo control circuit (20) is high to activate the relay (23) to drive the power circuit (40) for supplying power.

At the same time, the light of the neon lamp (16) also makes the resistance of the photo resistor (32) low. Therefore, the output of the second photo control circuit (30) is low, and the relay (33) is not activated so that the power circuit (40) supplies power to the load via the relay (33).

If the power supply is normal and the switch (12) is off, the neon lamp (15) of the voltage level circuit (10) is off and the other neon lamp (16) receives a small current from the indication lamp (11) to be turned on. Therefore, the second photo control circuit (30) outputs a low voltage level and the relay (33) is not activated. The load is still connected to the output of the power circuit (40) via the relay (33).

Because the neon lamp (15) is off, the first photo control circuit (20) outputs a low voltage level to disable the supply of power from the power circuit (40). Therefore, in such a status, no power is supplied to the load and thus the load is turned off.

If the power supply fails and the neon lamps (15, 16) are all off, the first photo control circuit (20) outputs a low voltage level and thus the input of the power circuit (40) is separated from the input power. The output of the second photo control circuit (30) becomes high because the resistance of the photo resistor (32) is increased. The relay (33) is excited so that the common end of the relay switch is switched to the normally opened end. Therefore, the load is connected to the charge battery (50) via the relay (33), whereby the charge battery (50) supplies power to the load.

From the above description, the circuit structure and operation manner of the automatic power control device in accordance with the present invention can be known. It is appreciated that the device has the following advantages:

1. The device can be modularized for being easily installed without a complicated wire connection.
2. The photo control circuit can fabricated as an IC chip that is accurately operated in a fast speed so that the charge battery can be switched to supply power when there is a mains power failure.
3. The device can be applied to different types of lamp devices or alarm systems to provide emergency illumination.

Although the present invention has been explained in relation to its preferred embodiment, it is to be understood that many other possible modifications and variations can be made without departing from the spirit and scope of the invention as hereinafter claimed.

What is claimed is:

1. An automatic power control device comprising:
   a charge battery (50);
   a voltage level circuit (10) having an indication lamp (11), a switch (12) connected with said indication lamp (11) in parallel, two resistors R1, R2 respectively connected to an end of said switch (12), and two neon lamps (15, 16) connected to the two resistors R1,R2, so as to turn on one or two neon lamps (15, 16) by turning the switch off or on thereby generating light;
   a power circuit (40) for providing a power supply;
   a first and a second photo control circuit (20, 30) for detecting light from said neon lamps (15, 16) to activate said power circuit (40) for selectively supplying power to a load and said charge battery (50), wherein each photo control circuit (20, 30) has a photo resistor (22, 32) for detecting the light, and said first photo control circuit (20) has a first relay (23) to control the power supply of the power circuit (40) and said second photo control circuit (30) has a second relay (33) for determining whether said power circuit (40) or said charge battery (50) supplies power.

2. The automatic power control device as claimed in claim 1, further comprising a power detection circuit (60) connected to said charge battery (50) for detecting said charge battery (50) and controlling said second photo control circuit (30) to prevent said charge battery (50) from over-discharging.

3. The automatic power control device as claimed in claim 1, wherein said first photo control circuit (20) has a comparator (21) which has an input pin connected to said photo resistor (22) and a resistor, a reference voltage pin connected to two resistors, and an output pin connected to said first relay (23) which has a common end connected to an input power, and a normally opened end connected to said power circuit (40).

4. The automatic power control device as claimed in claim 1, wherein said second photo control circuit (30) has a comparator (31) which has an input pin connected to said photo resistor (32) and a resistor, a reference voltage pin connected to two resistors, and an output pin connected to said second relay (33) which has a common end connected to said load, and a normally closed end connected to said power circuit (40).

5. The automatic power control device as claimed in claim 3, wherein said power circuit (40) includes:

a transformer (41) having a primary winding connected to said input power via said first relay (23), and a secondary winding connected to a first and a second power supply circuit (42, 43); and each of said first and second power supply circuits (42, 43) having a bridge rectifier, a capacitor, and a voltage-stabilization IC, said first power supply circuit (42) having an output connected to said load via said second relay (33), and said second power supply circuit (42) being connected to said charge battery (50).

6. The automatic power control device as claimed in claim 4, wherein said power circuit (40) includes:

a transformer (41) having a primary winding connected to said input power via said first relay (23), and a secondary winding connected to a first and a second power supply circuit (42, 43); and each of said first and second power supply circuits (42, 43) having a bridge rectifier, a capacitor, and a voltage-stabilization IC, said first power supply circuit (42) having an output connected to said load via said second relay (33), said second power supply circuit (42) being connected to said charge battery (50).

7. The automatic power control device as claimed in claim 2, wherein said power detection circuit (60) has a comparator (61) which has a first input connected to said charge battery (51) via a resistor, a second input connected to a fixed reference voltage circuit formed by a resistor and a zener diode, and an output connected to the input of said second photo control circuit (30).

* * * * *